United States Patent
Fickler

(10) Patent No.: US 10,549,933 B2
(45) Date of Patent: Feb. 4, 2020

(54) DISPENSING DEVICE WITH ROTATING TRAY DISCHARGE WITH STACK WEIGHT RELIEF

(71) Applicant: MULTIVAC Sepp Haggenmüller SE & Co. KG, Wolfertschwenden (DE)

(72) Inventor: Bernhard Fickler, Hawangen (DE)

(73) Assignee: Multivac Sepp Haggenmüller SE & Co. KG, Wolfertschwenden (DE)

( * ) Notice: Subject to any disclaimer, the term of this patent is extended or adjusted under 35 U.S.C. 154(b) by 1 day.

(21) Appl. No.: 15/895,947

(22) Filed: Feb. 13, 2018

(65) Prior Publication Data

US 2018/0229949 A1 Aug. 16, 2018

(30) Foreign Application Priority Data

Feb. 16, 2017 (EP) .................................... 17156414

(51) Int. Cl.
| | |
|---|---|
| *B65B 43/50* | (2006.01) |
| *G07F 13/10* | (2006.01) |
| *B65G 59/06* | (2006.01) |
| *B65G 59/10* | (2006.01) |
| *B65B 43/44* | (2006.01) |
| *A47F 1/10* | (2006.01) |

(52) U.S. Cl.
CPC ............ *B65G 59/063* (2013.01); *A47F 1/106* (2013.01); *B65B 43/44* (2013.01); *B65G 59/108* (2013.01); *G07F 13/10* (2013.01); *B65G 2201/0258* (2013.01)

(58) Field of Classification Search
CPC ..... A47L 15/247; B65G 59/062; B65G 59/10; B65G 59/108; B65G 59/105; B65G 59/102; B65G 59/101; B65G 59/107; B65G 59/066; B65G 33/06; B65G 57/307; B65B 43/44; B65H 2404/663; G07F 13/10
USPC ............. 221/222, 297, 42; 414/495.6, 797.5, 414/797.7, 798.1
See application file for complete search history.

(56) References Cited

U.S. PATENT DOCUMENTS

| | | | | |
|---|---|---|---|---|
| 3,454,987 | A | | 7/1969 | Edwards |
| 3,741,410 | A | * | 6/1973 | Henschke ............ B65G 59/108 221/222 |
| 4,108,319 | A | * | 8/1978 | Kacirek ............... B65G 49/068 198/625 |
| 4,288,003 | A | * | 9/1981 | Fries, Jr. ............. B65G 59/108 221/1 |
| 4,884,795 | A | * | 12/1989 | Vander Syde ......... B65G 33/06 271/34 |

(Continued)

FOREIGN PATENT DOCUMENTS

| | | |
|---|---|---|
| CN | 105460626 A | 4/2016 |
| EP | 2186760 A1 | 5/2010 |

(Continued)

*Primary Examiner* — Gregory W Adams
(74) *Attorney, Agent, or Firm* — Husch Blackwell LLP

(57) ABSTRACT

A dispensing device that comprises vertical guidings for receiving a stack of a plurality of trays, a separating device for dispensing individual trays in a downward direction and a tray discharge device that has multiple rotating lifting elements. The dispensing device includes lifting elements that are formed cylindrically and have a comb structure with at least two immersing protrusions that extend in parallel to one another.

12 Claims, 6 Drawing Sheets

(56) References Cited

U.S. PATENT DOCUMENTS

| | | | | |
|---|---|---|---|---|
| 5,823,738 A | * | 10/1998 | Spatafora | B65G 57/307 414/795.1 |
| 6,098,379 A | * | 8/2000 | Spatafora | B65B 35/04 414/788.9 |
| 7,748,709 B2 | * | 7/2010 | Schwarzbauer | B65H 1/025 271/149 |
| 2002/0017447 A1 | * | 2/2002 | Emigh | B65H 29/12 198/610 |

FOREIGN PATENT DOCUMENTS

| | | | | |
|---|---|---|---|---|
| EP | 3055238 | | 3/2015 | |
| EP | 3023370 A1 | | 5/2016 | |
| GB | 2468667 A | * | 9/2010 | B65G 33/06 |
| WO | 2009150755 A1 | | 12/2009 | |
| WO | WO-2015028022 A1 | * | 3/2015 | B65G 59/108 |
| WO | WO-2016034179 A1 | * | 3/2016 | B65G 59/108 |

\* cited by examiner

US 10,549,933 B2

DISPENSING DEVICE WITH ROTATING TRAY DISCHARGE WITH STACK WEIGHT RELIEF

CROSS-REFERENCE TO RELATED APPLICATIONS

This Application claims priority to European Patent Application No. 17156414.9, filed on Feb. 16, 2017, to Bernhard Fickler, currently pending, the entire disclosure of which is incorporated herein by reference.

FIELD OF THE INVENTION

The invention relates to a dispensing device for dispensing individual trays from a stack of trays.

BACKGROUND OF THE INVENTION

A dispensing device is known from the WO 2015/028022 A1 (also published as EP3055238) in which a swash plate is arranged on a rotating axis together with a dispensing screw and in such a way that, in case of a rotation by 360°, the swash plate immerses into a tray stack above the dispensing screw between two trays that are adjacent on top of one another and/or its tray edges and lifts up the tray that fits tightly to the top side of the swash plate together with the stack of trays that is located on top of said tray. Therefore, the stress onto the lowest tray to be dispensed is reduced to a constant minimum.

Due to different stack heights, different stresses act onto the trays located in the area of the swash plate whereby such stresses can lead to different vertical distances between two adjacent trays that are lying in one another. Here it can occur that the swash plates disclosed in the state of the art, which are provided respectively at the corners or on opposite sides of the trays, do not lift up a single, joint tray but two trays, which are located on top of one another, on one side or at least not on all sides so that not the entire load of the tray stack is absorbed.

SUMMARY OF THE INVENTION

The purpose of the invention is to provide an improved embodiment of a tray discharge. The dispensing device according to the invention for dispensing of trays comprises vertical guidings for receiving a stack with a plurality of trays, a separating device for dispensing of isolated trays in a downward direction and a tray discharge device that has multiple rotating lifting elements. The dispensing device according to the invention is characterized in that the lifting elements may be formed essentially cylindrically and may have a comb structure with at least two immersing protrusions that are parallel to one another and that essentially extend in the circumferential direction of the lifting elements. The present invention provides an advantage that, for example meal trays, which are stacked into one another in a way that the trays can only be lifted up on the outermost edge and that the immersing depth into the stack can amount to less than 2 mm, can be processed as well. Such meal trays can also have a low stability on the tray edge so that it cannot be excluded that they fold and therefore slip through on the lifting element. Through simultaneous intake of multiple trays of the stack by means of multiple immersing protrusions, the stack may be prevented from slipping through in spite of the very low immersing depth because there is a load distribution of the stack onto multiple immersing protrusions.

On embodiment of the comb structures of the lifting elements may have at least four immersing protrusions, which extend in parallel to one another, in order to distribute the weight distribution of the stack in an improved way.

Two neighboring immersing protrusions may have a distance of 2 mm to 4 mm in order to also be able to lift up a stack with trays that are lying in one another and whose tray edges can overlap, process and/or lift up the upper side of a tray that is located underneath.

In this context, the immersing protrusions in a particularly advantageous embodiment may have an identical distance to one another. This way, both a weight distribution over at least two immersing protrusions as well as also processing of standard trays with larger distances of the trays to one another and immersing protrusions that immerse more deeply are enabled.

In a particularly preferred embodiment, the immersing protrusions may have a section or portion that ascends in a screw-shaped way to lift the stack smoothly and a horizontally extending portion. In addition, an embodiment may optionally include a descending portion in order to lower the stack smoothly into the initial position. This may ensure a particularly calm work process.

In the circulating direction, in one embodiment, the immersing protrusions may extend preferably over an arc length portion of an outer side corresponding to less than a three-hundred-fifty degree (350°) rotation, preferably less than a two-hundred-seventy degree (270°) rotation, in order to lead the immersing protrusion out of the stack so that the stack can be tracked in a downward direction.

In one embodiment, invention intends that the stack may be lifted temporarily by at least 3 mm in case of a rotation of the lifting element of three-hundred-sixty degrees (360°) using the immersing protrusions.

Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the present invention will be explained in more detail making reference to a drawing, in which the individual figures show.

DETAILED DESCRIPTION OF THE INVENTION

Figure 1:
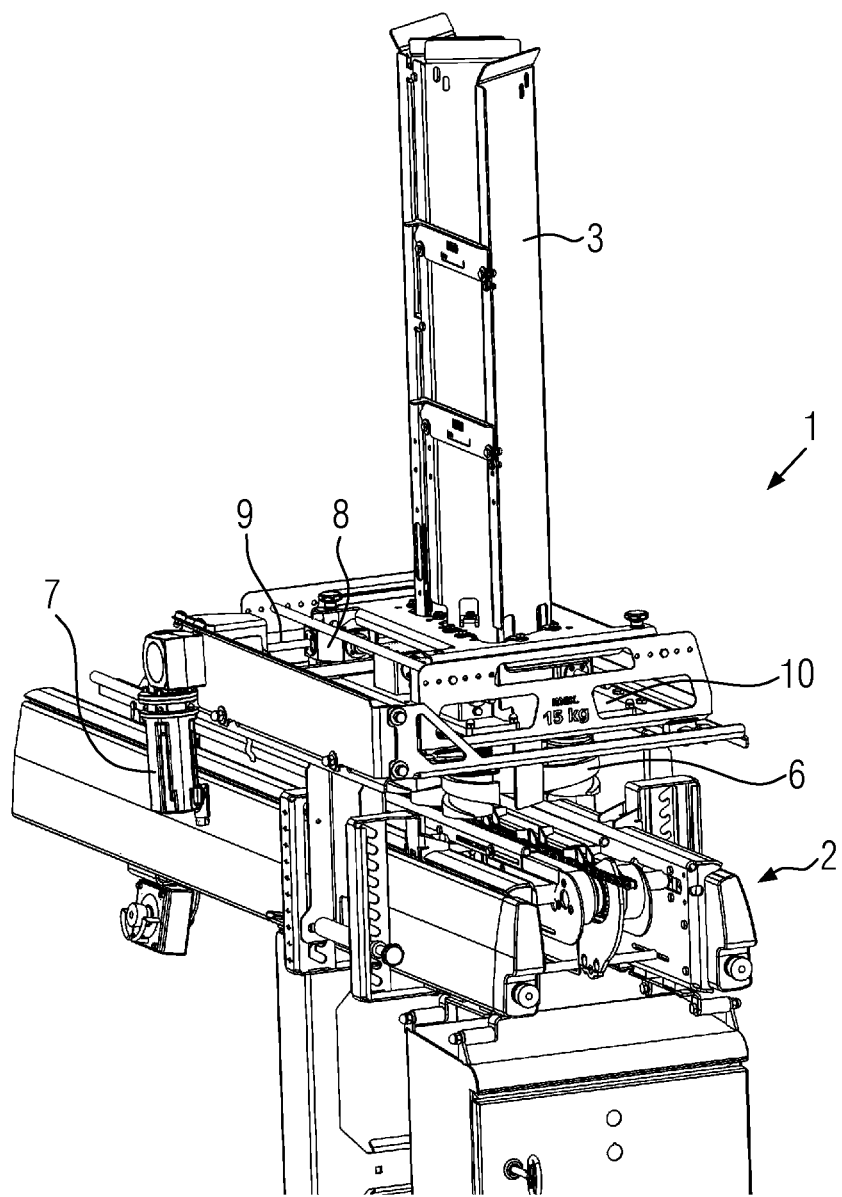
FIG. 1 is a perspective view of one embodiment of a dispensing device and a transport unit in accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a dispensing device 1 according to the invention that is configured to drop trays individually onto a transport unit 2 in order to subsequently feed the trays into a filling station or inserting station of a packaging machine. The dispensing device 1 has vertical guidings 3 to receive a stack 4 of trays 5 that is shown in greater detail in FIG. 2. Four dispensing screws 6 are driven by a joint motor 7, preferably by a servo motor. Respectively two dispensing screws 6 are installed by means of respectively one gear 8 for each dispensing screw 6 on a joint gear shaft, which is not described any further, and can be moved along said gear shaft in order to be adaptable to different tray sizes. On each of the four axes of the dispensing screws 6, a tray discharge device 10, see FIG. 2, is provided to hold and/or to lift the stack 4 and hence to reduce the force of the stack 4 onto the dispensing screws 6 and/or the lowest tray 5.

Figure 2:
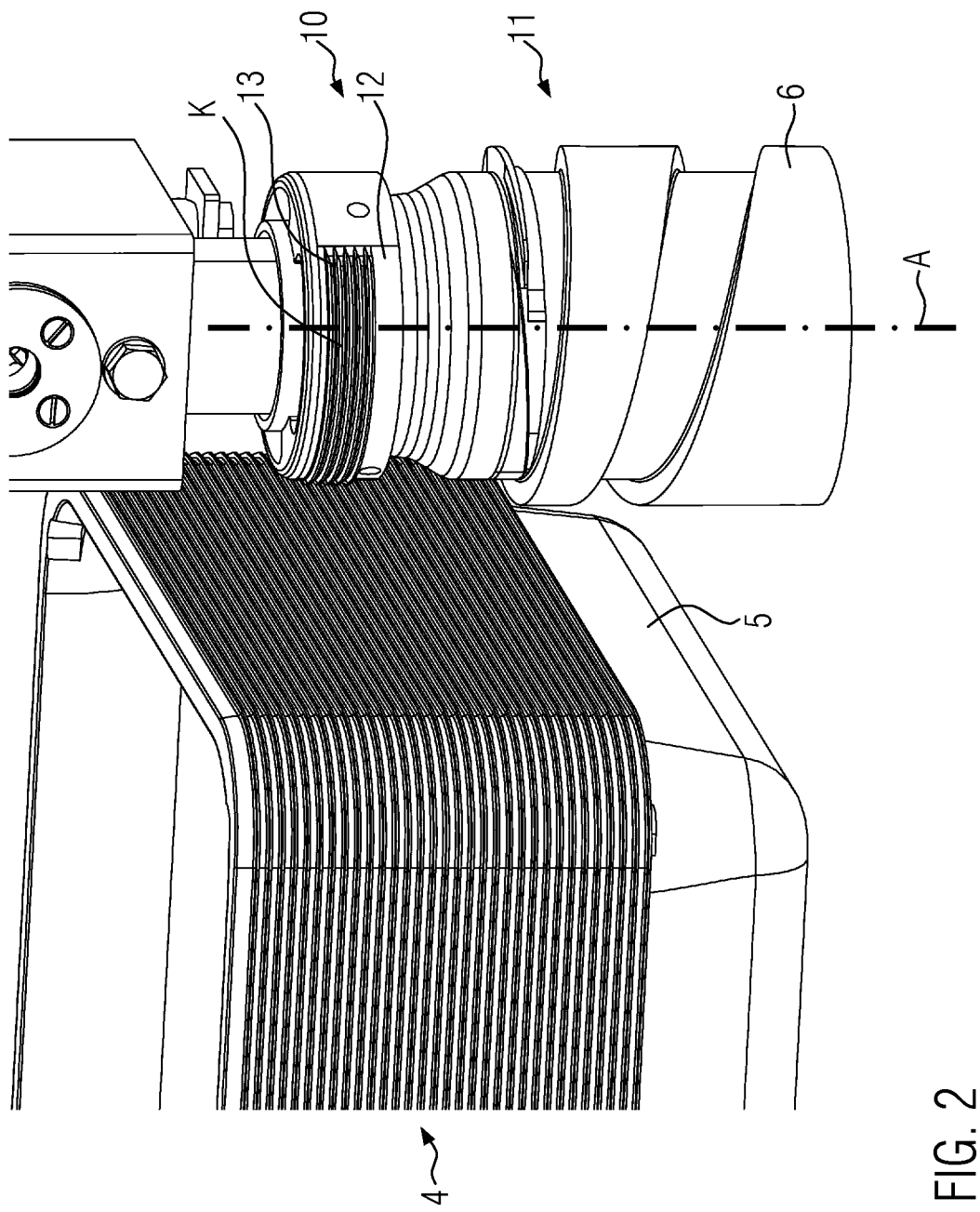
FIG. 2 is a front perspective enlarged view of one embodiment of a tray discharge device in accordance with the teachings of the present disclosure.

FIG. 2 shows an enlarged view of a separating device 11 for dispensing of individual trays 5 from the stack 4. For this purpose, the separating device 11 has the dispensing screw 6 with a rotary axis. The tray discharge device 10 is provided on the joint axis A on top of the separating device 11. The tray discharge device 10 has a lifting element 12 that rotates around the axis A and jointly and/or synchronously with the dispensing screw 6. The lifting element 12 has an essentially cylindrical form. On its outer side, a comb structure K with five immersing protrusions 13, which extend in parallel to one another and which extend over a portion of approx. 270° along the circumference of the lifting element 12, is provided. In this context, the immersing protrusions 13 extend in a way that is in one portion 14 gradually ascending in a screw-shaped way in the axial direction and subsequently horizontal in a portion 16. Also an ascending portion 14 and a descending portion that follows at a later stage are conceivable. The ascending portion 14 is used for lifting the stack 4 and the optional descending portion for smooth deposition of the stack 4 on the top immersing protrusion 13 of the dispensing screws 6. In the following Figures, different phases, which occur within one rotation of the lifting element 12, are explained in greater detail.

Figure 3:
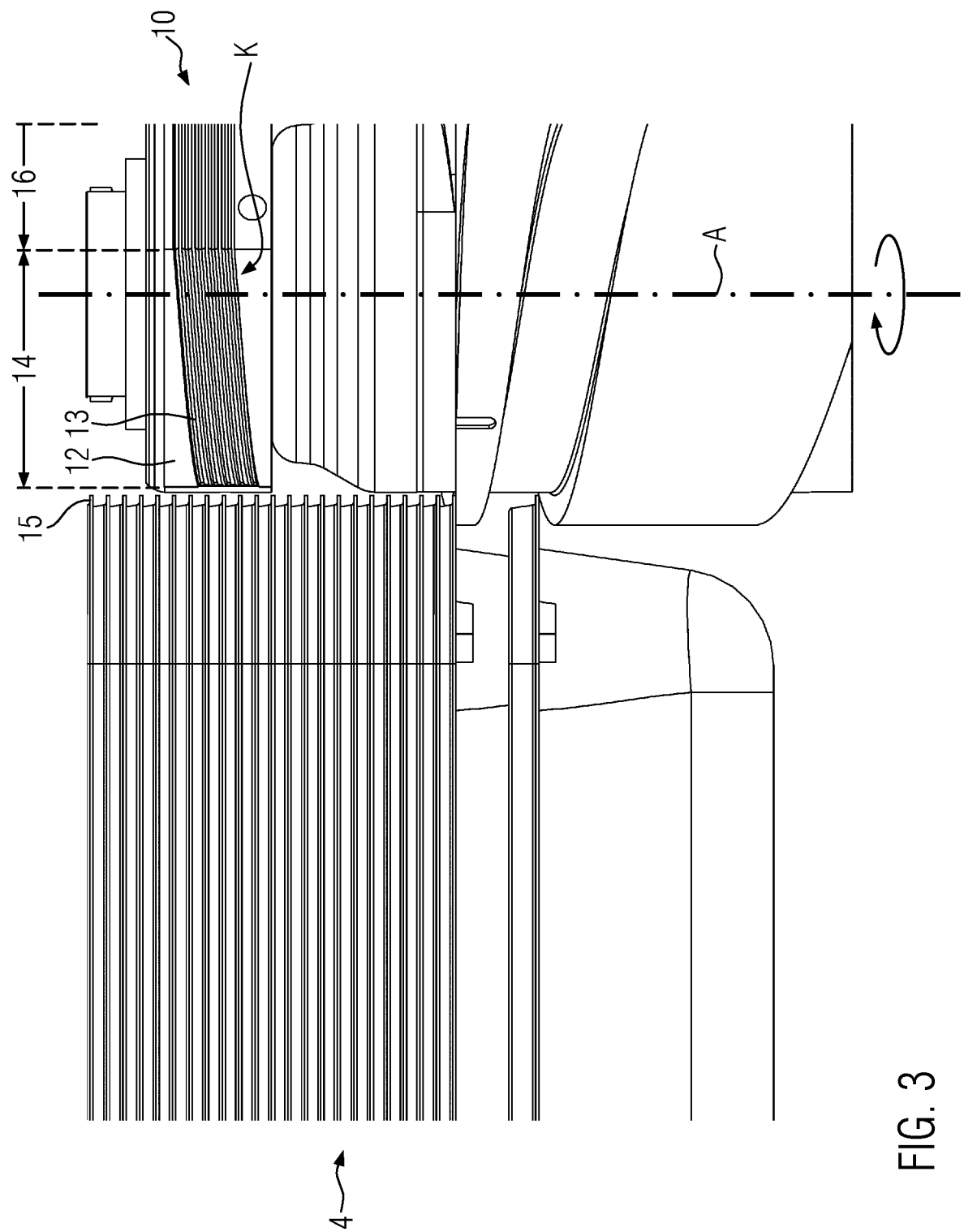
FIG. 3 is a side view of the tray discharge device of FIG. 2 in a first phase.

FIG. 3 shows a side view of the tray discharge device 10 in a first phase in which the lifting element 12 starts to rotate in the arrow direction and/or in a clockwise direction. At the beginning of the ascending portion 14, the immersing protrusions 13 of the comb structure K are still radially spaced from the tray edges 15, preferably by 0.1 to 1.0 mm. The immersing protrusions 13 themselves respectively have a preferred vertical distance of 2 to 4 mm from one another in order to be able to also receive trays 15, which are positioned tightly on top of and in one another, individually on their tray edges.

Figure 4:
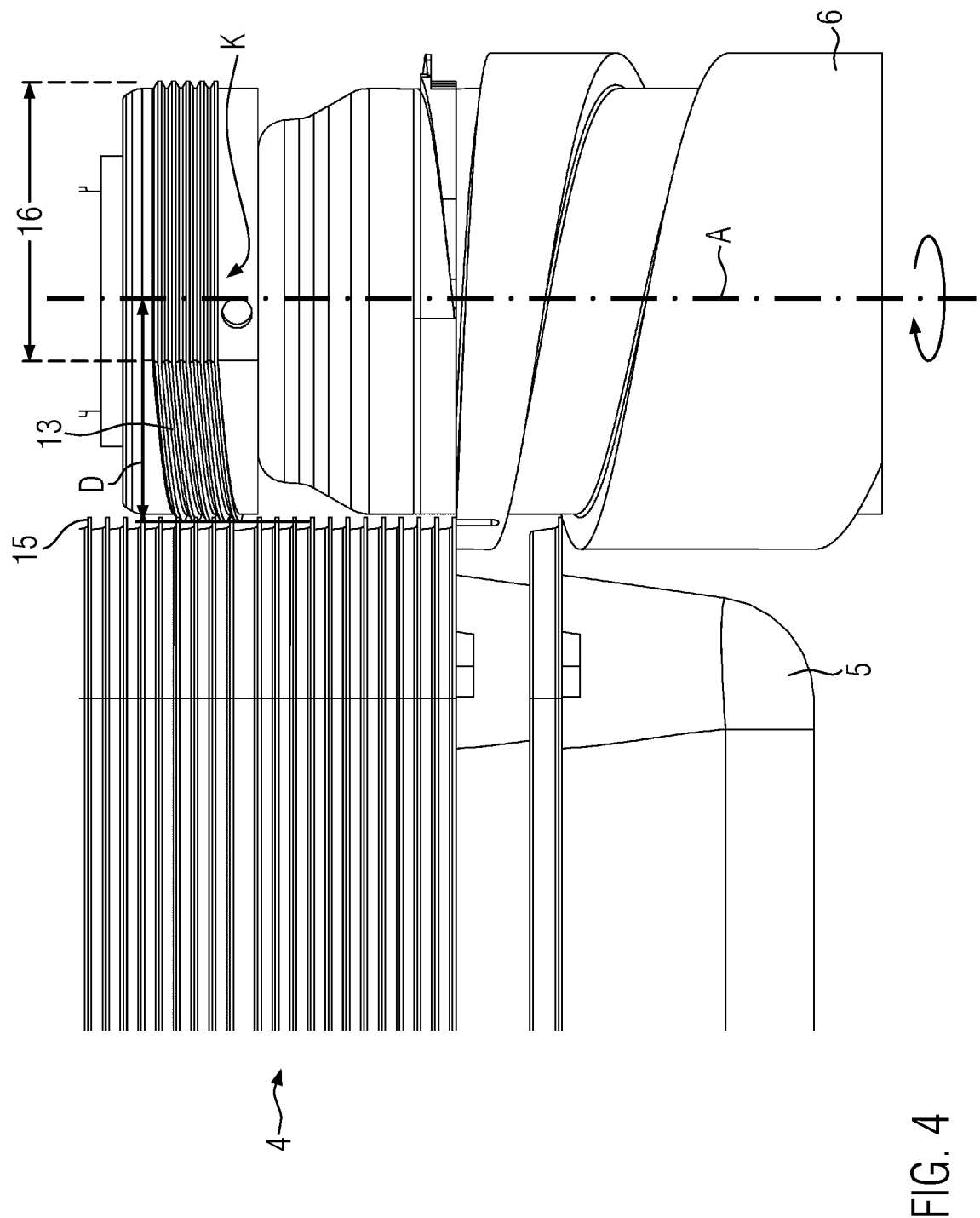
FIG. 4 is a side view of the tray discharge device of FIG. 2 in a second phase.

FIG. 4 shows a second phase in which the rotating immersing protrusions 13 immerse in the stack 4 in such a way that the height of the immersing protrusions 13, i.e. its radial distances D from the axis A, increase and therefore push the trays 5 and/or their tray edges 15 at least partially apart or only lift said trays and/or tray edges. A lowest tray 5, which has already been detached from the stack 4 by the dispensing screw 6 before, is, however, conveyed downwards.

Figure 5:
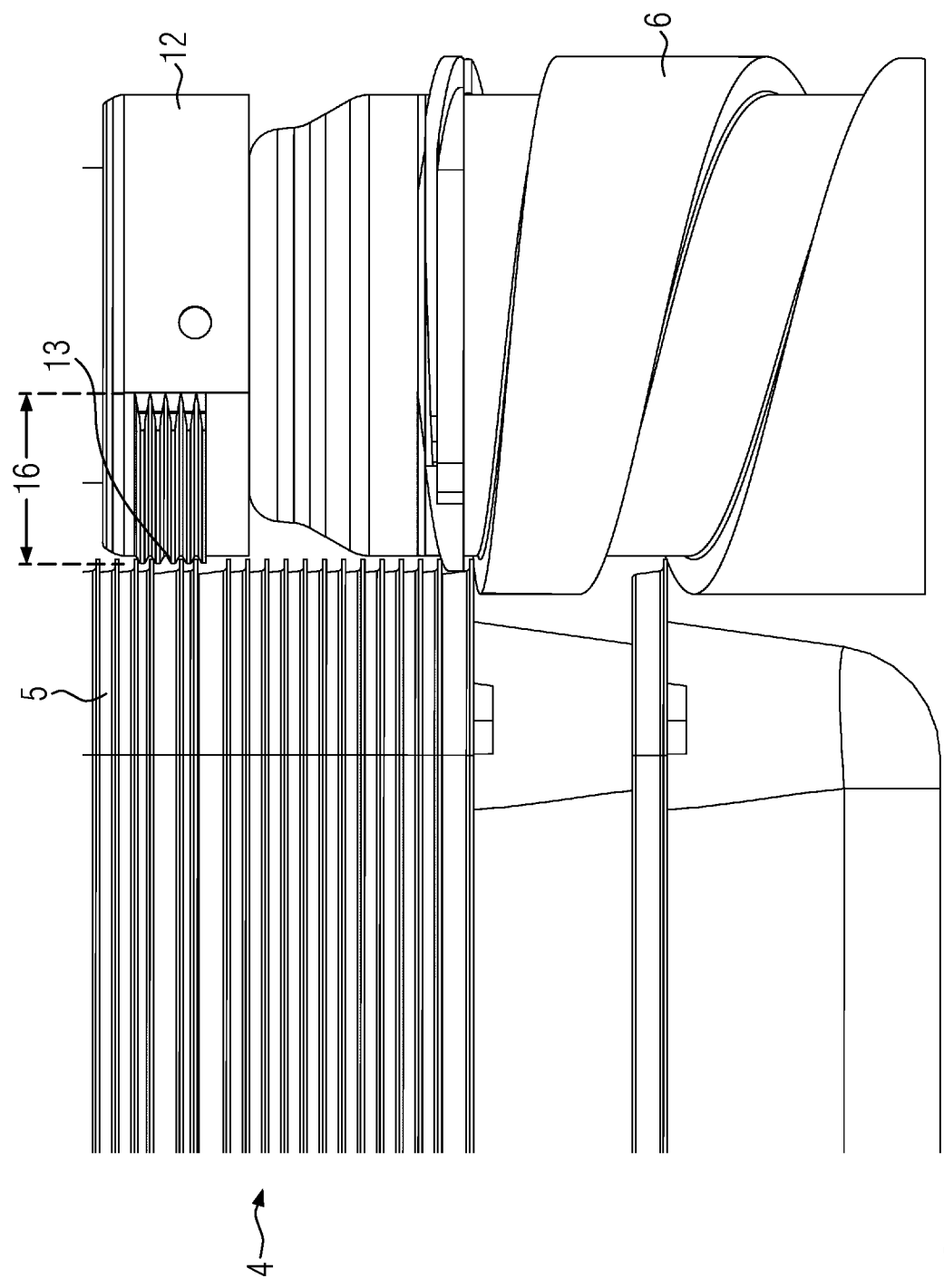
FIG. 5 is a side view of the tray discharge device of FIG. 2 in a third phase.

As shown in FIG. 5 in a third phase, the stack 4 and/or the trays 5 grabbed by the immersing protrusions 13 are further lifted in the further rotary movement of the lifting element 12 and hence the load of the stack 4 of the number of trays 5, which is located between the tray discharge device 10 and the dispensing screw 6, is reduced and/or completely taken off. This minimizes and/or limits the load and/or weight force onto the lowest tray 5 prior to or during dispensing by the dispensing screw 6. Depending on the distance of the trays 5 from one another in the stack 4, all immersing protrusions 13 carry respectively one tray 5 or also a gap can be formed and not all immersing protrusions 13 lift a tray 5. At least two trays 5 should be grabbed by immersing protrusions 13 and trigger lifting of the stack 4 in order to distribute the load of the trays 5 over the immersing protrusions 13 to prevent the stack 4 from slipping through, especially in case of a low immersion depth from 1 to 3 mm of the immersing protrusions 13 into the stack 4 and/or under the tray edges 15. The portion 16 of the immersing protrusions 13 that follows opposite to the rotation direction is formed horizontally with a vertically aligned axis A in order to keep the stack 4 in the lifted position.

Figure 6:
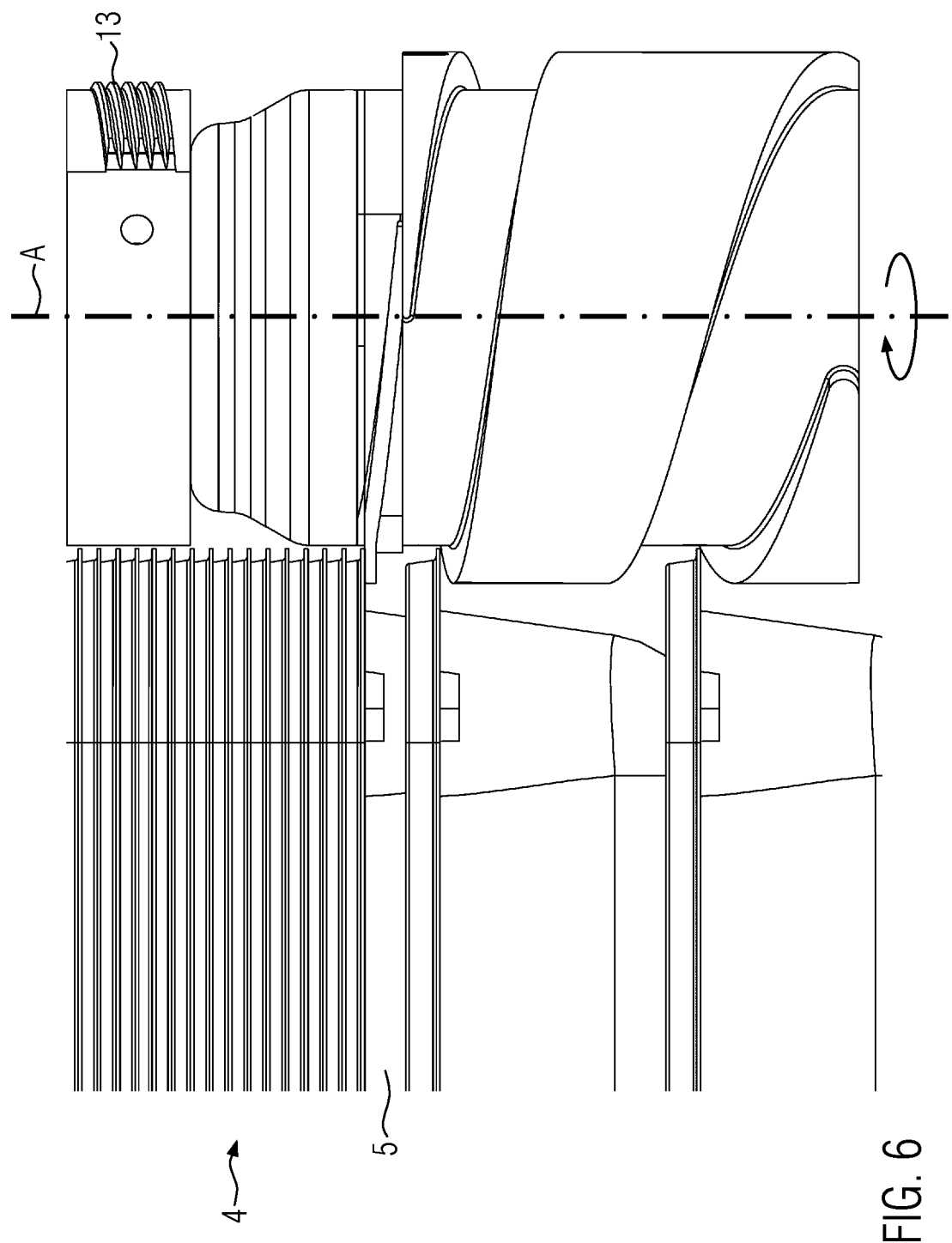
FIG. 6 is a side view of the tray discharge device of FIG. 2 in a fourth phase.

FIG. 6 shows how in the fourth and last phase prior to finishing a complete 360° rotation the immersing protrusions 13 once again reduce their radial distance to the axis A and move out of the stack 4 so that the lifted stack 4 slides along in a downward direction onto the trays 5 located underneath before the workflow described before starts over again. To be able to make the deposition as smooth as possible, a descending portion that is not shown in greater detail can follow the horizontal portion 16, see FIG. 5. Therefore, the horizontal portion 16 is shortened.

The dispensing screws 6 with the lifting elements 12 that are arranged on the joint axis A can be provided respectively in close proximity to the four corners of the stack 4. In this context, they can be arranged for example in a way as to be distributed over four sides or on two opposite sides of a rectangular stack 4.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in

What is claimed is:

1. A dispensing device for dispensing of trays comprising:
   a plurality of vertical guidings for receiving a stack, said stack comprising a plurality of trays;
   a separating device for dispensing individual trays in a downward direction; and
   a tray discharge device that includes two or more lifting elements that each rotate around a respective axis, wherein each of the two or more lifting elements are formed in a cylindrical way and comprise a comb structure having at least two immersing protrusions disposed on an outer side of the lifting elements, wherein the at least two immersing protrusions extend in parallel to one another;
   wherein the at least two immersing protrusions are disposed on the outer side to extend radially from the axis in a horizontal direction over an arc length corresponding to less than a continuous 270° portion of a cylindrical outer surface of the lifting elements.

2. The dispensing device according to claim 1, wherein the lifting elements have at least four immersing protrusions that extend in parallel to one another.

3. The dispensing device according to claim 1, wherein the at least two immersing protrusions extend radially from the axis in a horizontal direction and are separated by a vertical distance between 2 mm and 4 mm.

4. The dispensing device according to claim 1, wherein the at least two immersing protrusions extend an identical distance radially from the axis in a horizontal direction.

5. The dispensing device according to claim 1, wherein the at least two immersing protrusions have a first portion that ascends in a screw-shaped way around the outer side of the lifting elements to lift the trays in a portion of the stack that is disposed above the at least two immersing protrusions, and the at least two immersing protrusions have a second portion that is horizontal.

6. The dispensing device according to claim 1, wherein the at least two immersing protrusions have a varying radial distance from the axis over a course of each of the at least two immersing protrusions.

7. The dispensing device according to claim 5, wherein a radial distance of the at least two immersing protrusions from the axis increases in the course of the first portion that ascends and the radial distance of the at least two immersing protrusions from the axis remains at constant in the course of the second portion that is horizontal.

8. A dispensing device for dispensing of trays comprising:
   a plurality of vertical guidings for receiving a stack, said stack comprising a plurality of trays;
   a separating device for dispensing individual trays in a downward direction; and
   a tray discharge device that includes two or more lifting elements that each rotate around a respective axis, wherein each of the two or more lifting elements are formed in a cylindrical way and comprise a comb structure having at least two immersing protrusions disposed on an outer side of the lifting elements, wherein the at least two immersing protrusions extend in parallel to one another;
   wherein the at least two immersing protrusions have a varying radial distance from the axis over a course of each of the at least two immersing protrusions.

9. The dispensing device according to claim 8, wherein the at least two immersing protrusions have a first portion that ascends in a screw-shaped way around the outer side of the lifting elements to lift the trays in a portion of the stack that is disposed above the at least two immersing protrusions, and the at least two immersing protrusions have a second portion that is horizontal.

10. The dispensing device according to claim 9, wherein a radial distance of the at least two immersing protrusions from the axis increases in the course of the first portion that ascends and the radial distance of the at least two immersing protrusions from the axis remains at constant in the course of the second portion that is horizontal.

11. The dispensing device according to claim 8, wherein the at least two immersing protrusions are disposed on the outer side to extend radially from the axis in a horizontal direction over an arc length corresponding to less than a continuous 270° portion of a cylindrical outer surface of the lifting elements.

12. The dispensing device according to claim 8, wherein the at least two adjacent immersing protrusions extend radially from the axis in a horizontal direction and are separated by a vertical distance between 2mm and 4mm.

* * * * *